United States Patent [19]

Edwards et al.

[11] Patent Number: 4,882,531
[45] Date of Patent: Nov. 21, 1989

[54] INTEGRATED CIRCUIT VOLTAGE REGULATOR AND CHARGING SYSTEM

[75] Inventors: Arthur J. Edwards, Hoffman Estates, Ill.; Randall C. Gray, Tempe, Ariz.

[73] Assignee: Motorola Inc., Schaumburg, Ill.

[21] Appl. No.: 249,033

[22] Filed: Sep. 26, 1988

[51] Int. Cl.$^4$ ........................... H02J 7/16; H02P 9/10
[52] U.S. Cl. ........................................ 322/60; 322/73; 322/88
[58] Field of Search ..................... 322/28, 60, 88, 73

[56] References Cited

U.S. PATENT DOCUMENTS

| | | | |
|---|---|---|---|
| 3,568,041 | 3/1971 | Arakane | 322/60 X |
| 3,593,102 | 7/1971 | Kawashima et al. | 322/60 X |
| 3,611,112 | 10/1971 | Lehinoff | 322/60 X |
| 3,982,169 | 9/1976 | Cummins | 322/60 X |
| 4,293,811 | 10/1981 | Muto et al. | 322/60 |
| 4,386,310 | 5/1983 | Sievers | 322/28 |
| 4,388,586 | 6/1983 | Lamoth | 323/283 |
| 4,388,587 | 6/1983 | Lamoth et al. | 323/283 |
| 4,451,776 | 5/1984 | Iwaki et al. | 322/60 X |

Primary Examiner—R. J. Hickey
Attorney, Agent, or Firm—Phillip H. Melamed

[57] ABSTRACT

Integrated circuit voltage regulator (60; 81; 91) is provided for use in a battery charging system (10) for providing excitation current to a field coil (13) of an alternator (11). The integrated circuit voltage regulator includes a transistor (70) which is selectively switched on and off to implement the prior art diesel diode (26) functions of providing initial field coil excitation current while preventing undesired current flow from an alternator voltage supply terminal (20) during subsequent field coil excitation current. The transistor (70) is provided as part of an integrated circuit and, therefore, eliminates the need for a diesel diode (26) external to the integrated circuit. In addition, use of the switched transistor (70) minimizes voltage drop loss when providing initial field excitation current. Constructing the transistor (70) as a PNP vertical substrate transistor minimizes integrated circuit area and simplifies integrated circuit topology.

23 Claims, 3 Drawing Sheets

FIG. 1 —PRIOR ART—

INTEGRATED CIRCUIT VOLTAGE REGULATOR AND CHARGING SYSTEM

BACKGROUND OF THE INVENTION

The present invention relates generally to the field of voltage regulators, and battery charging systems which utilize voltage regulators. Such systems are commonly utilized in automotive applications where a voltage regulator provides field current excitation for an alternator that, in turn, provides charging current for maintaining a battery at a predetermined voltage level.

In such systems, operation is commenced in response to the closure of an ignition switch which results in a battery supplying initial field coil excitation to the alternator. Typically, subsequent field coil excitation and operative power for the voltage regulator are provided by an auxiliary alternator power supply output voltage provided by an alternator auxiliary diode trio and provided in accordance with alternator power output. Examples of such prior systems are illustrated in U.S. Pat. Nos. 4,386,310, 4,388,556 and 4,388,587, assigned to Motorola, Inc.

Typically, the initial field coil excitation current is provided by the ignition switch connecting a battery potential to the field coil through an indicator lamp. The ignition switch also is used to connect this same battery potential to other automotive loads such as an ignition spark timing module, a fuel pump and/or a fuel supply valve such as is used in diesel engines. Because the battery potential supplied by the ignition switch and the auxiliary alternator power supply output voltage are both connected to supply field coil excitation current, some prior systems have encountered the problem that when the ignition switch is opened, the loads which were receiving battery potential now continue to receive DC operative power due to connections to the terminal at which the auxiliary alternator power supply voltage is developed. This can result in engine run-on after the opening of the ignition switch wherein this effect is commonly termed "dieseling".

To correct the above-noted problem, some prior art systems and circuits, such as those shown in FIGS. 1 and 2, have utilized a diesel diode implemented external to an integrated circuit (IC) voltage regulator to prevent the auxiliary alternator power supply voltage from providing DC current to engine loads which are only to be operative in accordance with the opening and closing of the ignition switch. While such systems are feasible, the providing of this additional external diode component with respect to the integrated circuit voltage regulator adds to the assembly cost and expense of a charging system. Simply incorporating such a diode within the integrated circuit is typically not feasible or desirable since the diode must be able to withstand large reverse voltages caused by transient signals produced by the electrical loads powered by the ignition switch directed battery voltage. Also, the providing of a diesel diode, whether inside an IC voltage regulator or external to it, somewhat degrades the performance of prior charging systems since the diesel diode implements a forward biased diode voltage drop of approximately 0.7 volts. This results in reducing the battery-supplied voltage potential that is to be used for developing initial field coil excitation. In other words, while providing a diesel diode may solve the problem of current flow from the auxiliary alternator output to various electrical loads, this reduces the battery potential available for initial field current for the alternator and, therefore, reduces alternator performance during its most critical operation corresponding to engine start-up.

SUMMARY OF THE PRESENT INVENTION

An object of the present invention is to provide an improved voltage regulator and charging system which overcomes the above-noted disadvantages of prior voltage regulators and systems which utilize a diesel diode.

A more specific object of the present invention is to provide an improved voltage regulator and charging system in which the functional isolation provided by a diesel diode is maintained, but the forward voltage drop generally associated with the diesel diode is reduced.

In one embodiment of the present invention, an improved voltage regulator is provided. This voltage regulator comprises: first means for receiving a battery-supplied voltage at a first input terminal and coupling said battery-supplied voltage to another terminal to be connected to a field coil of an alternator to provide a voltage source for initial field coil excitation current; second means for receiving at a second input terminal an alternator-supplied voltage varying in accordance with power output of said alternator, said second means including an output stage means providing an output signal at an output terminal, selectively and in accordance with a sensed variable input voltage, to control subsequent field coil excitation current provided by said alternator-supplied voltage subsequent to said initial field coil excitation current, said output terminal to be connected to said field coil with said output stage means in series with said field coil and said alternator-supplied voltage provided across the series connection of said field coil and said output stage means such that said alternator-supplied voltage provides a voltage source for said subsequent field coil excitation current; said first means including a semiconductor device which passes said initial field coil excitation current from said first input terminal to said field coil and prevents current flow from said alternator-supplied voltage at said second input terminal to said first input terminal, said second circuit means being formed as part of a semiconductor integrated circuit (IC) with said second input terminal and said output terminal each corresponding to separate associated input and output external leads of said IC, respectively, wherein the improvement comprises said semiconductor device comprising a transistor means for passing said initial field coil excitation current from said first input terminal through emitter and collector electrodes of said transistor means to one of said output and input external leads, a base electrode of said transistor means connected to circuitry means for turning said transistor on during the providing of said initial field coil excitation current and for turning said transistor off, and thereby preventing current flow between said emitter and collector electrodes, during the providing of said subsequent field coil excitation current.

The present invention preferably provides less than one forward biased diode voltage drop between the collector and emitter electrodes during the providing of the initial field coil excitation current. Also, preferably the transistor means corresponds to a PNP transistor formed as part of the same IC on which said second means is formed. The present invention also contemplates an integrated circuit voltage regulator charging system for controlling field excitation of an alternator which includes the improved voltage regulator as stated above.

Preferably, the present invention implements the function of the previous external diesel diode by the use of a transistor implemented as part of an integrated circuit. Battery-supplied initial field coil excitation current is passed through the emitter and collector terminals of the transistor while the transistor is turned on. When alternator-supplied voltage is sufficient to provide field coil excitation current, the transistor is effectively turned off. This prevents the alternator-supplied voltage from providing current flow to other electrical loads which receive operative power via an ignition switch connected to a battery, with the ignition switch also selectively providing the battery potential which supplied the initial field coil excitation current. The present invention also deals with specific preferred configurations for the integrated circuit transistor that implements the function of the diesel diode, wherein these configurations comprise preferred electrical schematic configurations, as well as preferred integrated circuit topology for implementing such a transistor. The preferred integrated circuit topology of the present invention allows providing such a transistor on the IC, while utilizing a miniumum number of integrated circuit diffusion layers and requiring the use of a minimum amount of integrated circuit area. This is essentially implemented by constructing the transistor as a vertical PNP substrate integrated circuit transistor.

The aforesaid features and advantages of the present invention, as well as additional features and advantages, can best be understood by referring to the subsequent detailed description of the present invention.

BRIEF DESCRIPTION OF THE DRAWINGS

For a more complete understanding of the present invention, reference should be made to the drawings, in which.

DETAILED DESCRIPTION OF THE PREFERRED EMBODIMENT

Figure 1:
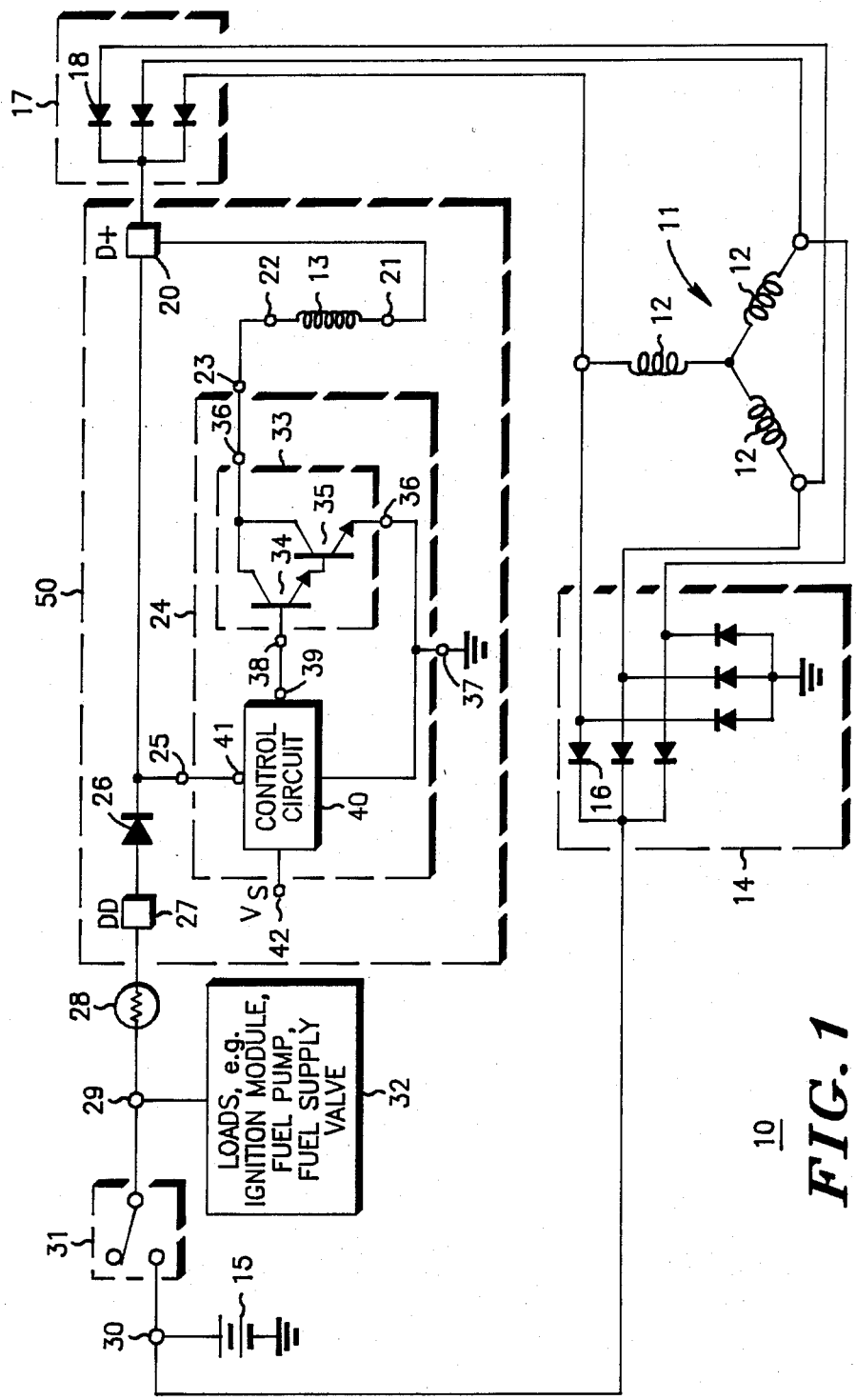
FIG. 1 is a schematic diagram of a prior art alternator charging system having a voltage regulator portion.

Referring to FIG. 1, an alternator charging system 10 is illustrated in which an alternator 11, comprising alternator output windings 12 and a field coil 13, provides DC charging current, via a main rectifier bridge 14, for charging a battery 15. While the alternator windings 12 in FIG. 1 are illustrated in a Y configuration, clearly a conventional delta configuration could also be utilized. In response to selectively-applied field coil excitation current, the alternator windings 12 produce AC signals which are rectified by the main rectifier bridge 14, comprising six rectifier diodes 16. The bridge 14 provides a DC charging current for maintaining of the battery 15 in a charged condition. Such operation is conventional in automotive charging systems such as the system 10.

In addition to the main rectifier bridge 14, an auxiliary diode trio bridge 17 is provided which comprises three rectifying diodes 18. The cathodes of these rectifying diodes 18 are connected together at an auxiliary alternator-supplied voltage terminal 20 at which an alternator-supplied voltage D+ is provided which varies in accordance with the power output of the alternator 11. The signal D+ at the terminal 20 will be utilized to supply operative power to a voltage regulator, as well as supplying subsequent field coil excitation current.

For the embodiment shown in FIG. 1, a terminal 21 at one end of the field coil 13 is directly connected to the terminal 20, and a terminal 22 at another end of the field coil 13 is directly connected to an external output lead terminal 23 of an integrated circuit voltage regulator 24 shown dashed in FIG. 1. A power supply external lead terminal 25 of the voltage regulator is also directly connected to the terminal 20 and connected to the cathode of a diesel diode 26 which has its anode directly connected to a first input terminal 27 at which a battery-supplied voltage DD is provided. The terminal 20, at which alternator-supplied signal D+ is provided, is referred to as a second input terminal. The terminal 27 is connected through a charging indicator lamp 28 to a terminal 29 which is selectively coupled to a positive terminal 30 of the battery 15 via an ignition switch 31. The negative terminal of the battery 15 is connected to ground. Other automotive electrical loads, such as, for example, an ignition module, a fuel pump and/or a fuel supply valve, are generally indicated by the component 32 which is directly connected to the terminal 29 to receive operative power therefrom.

The voltage regulator 24 includes an output stage 33, comprising a pair of Darlington-connected NPN transistors 34 and 35 having a common collector electrode terminal 36 directly connected to the external output lead terminal 23. The output stage 33 is connected in series with field coil 13 with signal D+ applied across the series connection of these components. The emitter of the transistor 34 is connected to the base of the transistor 35 which has its emitter electrode connected to a terminal 36 that is directly connected to an external lead terminal 37 of the voltage regulator directly connected to ground. A control terminal 38 of the output stage 33 is directly connected to the base of the transistor 34 and receives a control voltage from a direct connection to an output terminal 39 of a control circuit 40 shown in block form in FIG. 1. There is a connection from the control circuit to ground as indicated in FIG. 1, and the control circuit has a power input terminal 41, at which operative power for the control circuit is received, which is connected directly to the terminal 25. The control circuit receives a signal $V_S$ related to sensed variable battery voltage, and in FIG. 1 this is shown as being provided at an external lead terminal 42 of the voltage regulator 24.

Essentially, the operation of the voltage regulator 24 shown in FIG. 1 is conventional in that, in response to a battery-sensed voltage $V_S$, conductivity of the Darlington stage 33 is controlled so as to provide field coil current excitation that maintains the voltage across the battery 15 at a predetermined voltage level. A typical configuration for the voltage regulator 24 shown in FIG. 1 can comprise any of the voltage regulator circuits shown in the previously-referred Motorola, Inc. patents. A conventional flyback diode (not shown) should be provided in parallel with the field coil 13, and may be part of the regulator 24.

In operation, the charging system 10 functions as follows. In response to initial closure of the ignition switch 31, operative power is provided at the terminal 29 for powering any of the loads 32. In response to the initial closure of the ignition switch 31, initial field coil excitation current passes through the lamp 29 to produce a visual indication of the supplying of initial field current. At the first input terminal 27, the battery-supplied voltage DD is provided, and the diesel diode 26 passes initial field coil excitation current through the diode to the terminal 20, and from there this initial field excitation is passed through the field coil 13 and through the output stage 33 to the ground terminal 17. Field coil excitation current passage through the output stage 33 is accomplished by virtue of a positive potential being applied to the power input terminal 25 of the voltage regulator 24 which results in the control circuit 40 providing some initial positive potential at the terminal 29 to switch on the output stage 33 so that it conducts.

With the application of initial field coil excitation, the alternator 11 will now produce power output in response to relative movement of the alternator windings 12 with respect to the field coil 13 wherein this is accomplished by an engine rotating either the windings 12 with respect to the field coil 13 or the field coil 13 with respect to the windings 12. In either case, alternator output power is provided which is then rectified by the main bridge 14 and used to charge up the battery 15. The amount of charging current produced is such that the voltage on the battery 15 is maintained at a predetermined level wherein battery voltage is sensed by the voltage $V_S$ at the terminal 42. It is noted that in some cases the terminal 42 may be directly connected to the terminal 25 if desired, or this terminal may be directly connected to the battery terminal 30.

As the alternator produces output power, the auxiliary alternator-supplied voltage D+ is provided at the second input terminal 20 wherein this voltage will typically correspond to the same alternator output voltage produced by bridge 14 at the terminal 30. When the voltage at the terminal 20 is approximately the same as battery voltage, this results in extinguishing the lamp 28 since there is now substantially no potential difference across this lamp. In addition, the alternator voltage produced at the terminal 20 will now provide subsequent field coil excitation current since the diesel diode 26 will essentially prevent the battery 15 from supplying field coil excitation current through the lamp 28. Even if the diesel diode 26 were not present, the fact that substantially no potential difference exists across the lamp 28 would result in the alternator effectively supplying its own field coil excitation current and voltage regulator power supply voltage at the terminal 25 due to the signal D+ being approximately equal to the voltage across the battery 15.

In prior systems, such as the system 10, in which the diesel diode 26 was not provided, the terminals 25, 20 and 27 were directly connected together. This created a problem when the ignition switch 31 was opened after previously being closed. The problem is that if the engine had already been started, the opening of the switch 31, while preventing the battery 15 from supplying operative voltage to the terminal 29 and loads 32, did not prevent the alternator-developed voltage signal D+ at the terminal 20 from providing a voltage potential at the terminal 29. Thus, even though the switch 31 was opened, some of the loads 32 might still continue to function. This resultdd in engine run-on, an effect commonly known as "dieseling" since it is common in diesel engines where a fuel supply valve is not immediately shut off in response to the opening of an ignition switch.

To prevent the "diesel" effect, prior art systems, such as the system 10, included the diesel diode 26. This diode has been provided as an external diode to the integrated circuit voltage regulator 24 and prevents the D+signal from passing through the diode 26 to the terminal 29 when the ignition switch 31 is opened. It should be noted that most of the loads 32 are inductive in nature, and this can result in a relatively large magnitude negative transient voltage at the terminal 29. This means that the diesel diode 26 must have a sufficient reverse voltage breakdown characteristic to prevent breakdown of the diode by the voltage across the terminals 20 and 27. An undesired side effect of providing the diesel diode 26 is that during the providing of initial field coil excitation current, the series voltage drop across the diesel diode will reduce, by one forward-biased semiconductor diode voltage, the amount of battery potential which will be applied to the terminal 20. This will therefore reduce the amount of initial field coil current during critical engine start-up operation, since the voltage at 20 determines the voltage applied across the field coil 13. In addition, since the diesel diode 26 is typically provided as a component external to the integrated circuit voltage regulator 24, additional component and component assembly expense is incurred.

Figure 2:
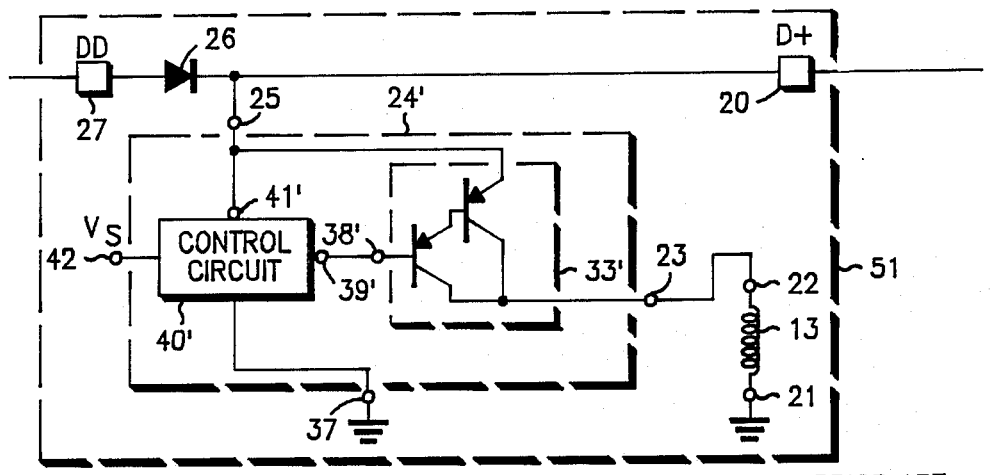
FIG. 2 is a schematic diagram of a prior art alternate configuration for the voltage regulator portion illustrated in FIG. 1.

In FIG. 1, the dashed area 50 essentially comprises a voltage regulator portion of the charging system 10. FIG. 2 illustrates a prior art alternative voltage regulator portion 51 corresponding to the voltage regulator portion 50. In FIG. 2, and in the other FIGS., identical reference numerals are utilized to identify identical terminals, signals and components. In FIG. 2, the configuration for the terminals 20, 25 and 27 and the diesel diode 26 is identical to that shown in FIG. 1. Voltage regulator portion 51 differs from regulator portion 50 in that an integrated circuit voltage regulator 24' is now illustrated as receiving the voltage sense signal $V_S$ at the terminal 42, and the power signal at the terminal 25. The regulator 24' provides, in response to $V_S$ and the signal at 25, the voltage regulator output signal at the terminal 23 so as to control field coil excitation current of the field coil 13.

In FIG. 2, the terminal 22 of the coil 13 is connected to the voltage regulator output lead terminal 23, but now the terminal 21 of the field coil is directly connected to ground. An output stage 33' is part of voltage regulator 24' and essentially comprises a Darlington pair of PNP transistors connected between the terminal 25 and the terminal 23 with a control terminal 38' of the output stage 33' receiving a control signal from a control circuit 40'. In response to the initial application of voltage to the terminal 25, the control circuit 40' will provide an initial relatively low voltage at the terminal 38' resulting in the output stage 33' directly passing field current excitation from the terminal 25 through the output stage 33' to the field coil 13. Subsequently, this takes place in accordance with the magnitude of the battery-sensed voltage VS at the terminal 42. Providing such a integrated circuit voltage regulator 24' can be readily implemented by utilization of known voltage regulator concepts and, therefore, no further description of the workings of the voltage regulator 24' will be provided. FIG. 2 has been described merely to illustrate that the field coil 13 can be directly connected between ground potential and the output terminal 23 of the integrated circuit voltage regulator, as shown in FIG. 2, rather than having the field coil connected between the terminal 23 and the terminal 20 at which the alternator-supplied signal D+ is provided.

Figure 3:
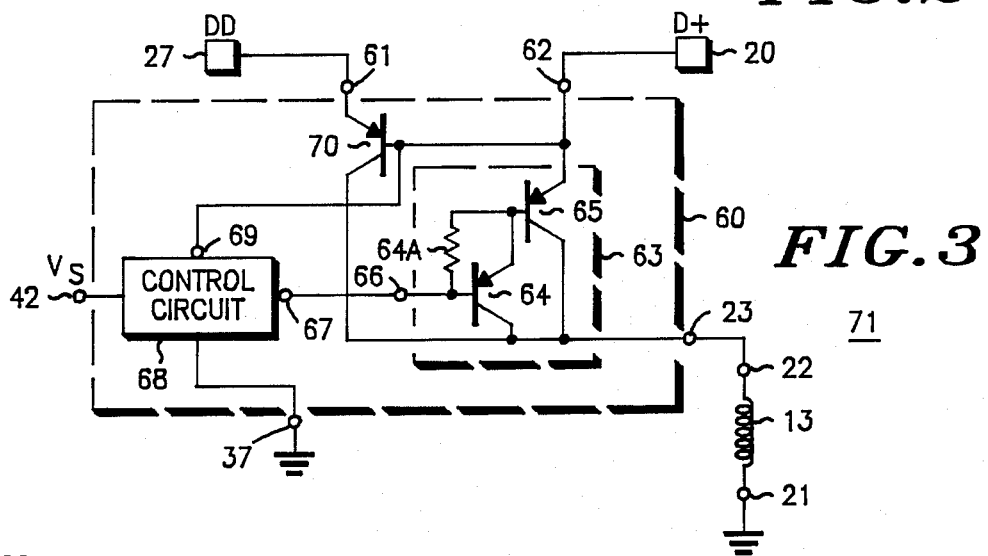
FIG. 3 is a schematic diagram of an integrated circuit voltage regulator portion constructed in accordance with the present invention which can directly replace the voltage regulator portion shown in the FIGS. 1 and 2.

Referring to FIG. 3, a preferred embodiment for an integrated circuit voltage regulator 60 is illustrated which is constructed in accordance with the present invention. The voltage regulator 60 includes an external output lead corresponding to the terminal 42 at which a sensed variable battery input voltage ($V_S$) is provided, an external lead corresponding to the terminal 37 connected to ground and an external lead corresponding to the terminal 23 at which a field excitation control signal is provided by the voltage regulator 60. In FIG. 3, the field coil 13 is connected between the terminal 23 and ground potential as was the case in FIG. 2. In FIG. 3, the first input terminal 27 at which the battery-supplied voltage DD is provided is directly connected to a first input external lead terminal of the integrated circuit 60 corresponding to terminal 61. In addition, second input terminal 20 at which the alternator-supplied voltage signal D+ is provided is directly connected to a second input external lead terminal corresponding to the terminal 62.

The voltage regulator 60 includes an output stage 63 connected in series with the field coil 13 between terminals 62 and 23 comprising a pair of PNP transistors 64 and 65 connected in a Darlington configuration The base of the transistor 65 is directly connected to the emitter of the transistor 64 and connected through a resistor 64A to the base of the transistor 64. The emitter of the transistor 65 is directly connected to the terminal 62, and the collectors of the transistors 64 and 65 are connected together and directly connected to the terminal 23. The output stage 63 includes a control terminal 66 corresponding to the base electrode of the transistor 64. The terminal 66 is directly connected to an output control terminal 67 of a control circuit 68 which is connected to ground terminal 37 and receives operating power by virtue of connections to a power input terminal 69. The control circuit 68 also is connected to the terminal 42 for receipt of the sensed variable input voltage signal $V_S$ related to sensed battery voltage. In addition, a PNP transistor 70 has its emitter directly connected to the terminal 61, its base connected to the terminal 62 and the terminal 69, and its collector directly connected to the terminal 23. All of the transistors 64, 65 and 70, as well as the control circuit 68 and other components of the output stage 63 are formed as part of the integrated circuit 60 and comprise semiconductor components formed on a base substrate on which all semiconductor components of the integrated circuit are provided.

The term "transistor", as used herein when referring to at least transistor 70, refers to a semiconductor device having a control electrode the voltage potential at which controls current conduction between two primary current electrodes of the transistor, and wherein the voltage potential at the control electrode is not always identical to the voltage potential present at either of the two primary current electrodes. This definition excludes having the control (base) electrode constantly, directly connected to one of the primary current electrodes (emitter or collector) by a short circuit, wherein this permanent short circuit connection would cause the semiconductor device to act as an effective diode instead of a transistor.

In essence, the integrated circuit transistor 70 effectively implements the function of the previous external diesel diode 26, but accomplishes this in a more efficient manner so as to minimize the series voltage drop across this device when the device is utilized to provide initial field coil excitation current to the field coil 13. The FIG. 3 IC voltage regulator 60 also implements the function of the diesel diode 26 without the use of a semiconductor device external to the IC, so less component assembly and fewer components are required. FIG. 3 comprises an improved voltage regulator portion 71 which is to be directly substituted for the voltage regulator portion 50 in FIG. 1 to provide an improved alternator charging system.

The operation of the voltage regulator portion 71 is as follows. In response to initial closing of the ignition switch 31, a battery-supplied voltage potential is provided at the terminal 27. The base of the transistor 70 is effectively connected to ground by virtue of either the connection of the base to the power input terminal 69 of the control circuit 68 or through the emitter base junction of the transistor 65, the resistor 64A connected between the base of transistor 65 and a low voltage initially provided at the terminal 67. Providing a low initial voltage at the control circuit output terminal 67 normally occurs since the initial VS voltage during engine start-up will be below full battery voltage. Also, a monostable multivibrator could be used wherein the monostable could be triggered by the power on transient voltage applied to terminal 69. In any event, initially the potential at the base of the transistor 70 is such that the transistor 70 is turned on. This results in initial field coil excitation current being provided through the transistor 70 by virtue of this initial field coil current passing through the emitter and collector electrodes of this transistor to the terminal 23 for subsequent passage through the field coil 13.

As the alternator subsequently produces a power output, the signal D+ at the terminal 20 will rise until it approximates battery voltage. This will result in turning the transistor 70 off by virtue of the connection of the base of this transistor to the terminal 62. Thus, as long as the signal D+ at the terminal 20 is greater than one forward-biased diode voltage drop below the signal DD at the terminal 27, the transistor 70 performs the function of preventing the transistor 70 from passing current from the alternator-supplied voltage D+ at the second input terminal 62 to the first input terminal 61. The "one forward-biased diode voltage drop" of course corresponds to the forward bias voltage needed across the base-emitter electrodes of transistor 70 to turn this transistor on. Thus, when the ignition switch 31 is subsequently opened, the auxiliary alternator-supplied voltage D+ at the terminal 20 will not provide DC potential for operating the loads 32 due to the isolation provided by transistor 70. In addition, the configuration shown in FIG. 3 results in the signal D+ providing operative power to the control circuit 68 and the output stage 63 during normal voltage regulation. This is because subsequent field coil excitation current for the field coil 13, after the initial providing of excitation by the battery voltage signal DD, occurs in accordance with the control signal 67 and such subsequent excitation current is provided by the voltage at the terminal 20 since the transistor 70 is then turned off so that it cannot provide field excitation current.

One significant advantage of the present invention is that the function of an isolating diesel diode has now been incorporated into an integrated circuit thus eliminating the requirement for an isolation diode external to the IC voltage regulator. In addition, the present invention implements this isolation function by virtue of the switching on and off of the transistor 70. Because a switched-on transistor is utilized for applying initial field coil excitation current, the voltage drop across the collector and emitter terminals of this transistor will be minimized by biasing the transistor 70, when on, so that it saturates. Thus the collector to emitter voltage of transmitter 70, when it provides initial field coil excitation current, is less than the voltage drop across one forward-biased semiconductor diode. Thus by turning on the transistor 70 such that it is effectively saturated, the voltage drop between the terminals 27 and 23, during the application of initial field coil excitation, can be minimized and made less than 0.7 volts. This is not possible if a discrete diesel diode is utilized to perform the functions of passing initial field coil excitation while providing isolation against undesired current flow from the terminal 20 to the terminal 27. Also note that in FIGS. 1 and 2, during initial field current excitation a voltage drop of the diesel diode 26 and the forward bias across the output stage is encountered which lower the battery voltage applied across the field coil. For the circuit configuration in FIG. 3 (and in FIG. 5), preferably only the saturation voltage of one transistor (transistor 70) lowers the battery voltage applied across the field coil.

Figure 4:
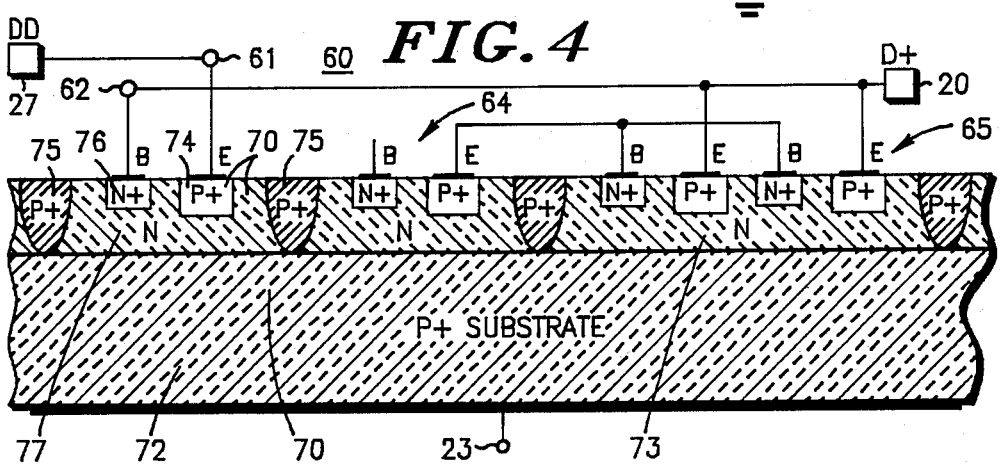
FIG. 4 is a cross-sectional schematic side view of the topology of an integrated circuit corresponding to the voltage regulator shown in FIG. 3.

Referring to FIG. 4, an advantageous configuration for the topology of the integrated circuit 60 is illustrated in cross section which allows an economical implementation of the transistor 70. As was previously noted, the isolation provided by this transistor must be able to withstand a significant potential which may exist between the terminals 20 and 27 due to inductive transients which pull the voltage at the terminal 27 below ground. This can be most advantageously insured by making the transistor 70 a vertical PNP substrate transistor.

Referring to FIG. 4, it is noted that the integrated circuit 60 comprises a substrate 72 formed of P-type semiconductor material. As is conventional, on top of this P-type substrate 72, a layer of N-type material 73 is grown. As shown in FIG. 4, a P-type diffusion area 74 is provided in the N-type layer 73 with the diffusion area 74 corresponding to the emitter of the transistor 70 and a portion 77 of the N-type layer 73 corresponding to the base. P-type isolation diffusion areas 75 are utilized to separate the base and emitter electrodes of the transistor 70 from other components formed on the integrated circuit substrate 72. The P-type diffusion area 74 forming the emitter of the transistor 70 is directly connected to the external lead terminal 61, and an N+ diffusion area 76 of the N portion 77 is directly connected to the external lead terminal 62. In FIG. 4, the areas 74 and 76 are not shown with cross-section hatching so as to maintain the clarity of FIG. 4.

The above-described configuration illustrates that the preferred construction for the transistor 70 is a vertical PNP substrate transistor in which the P substrate 72 forms the collector of the transistor 70. In FIG. 4 it should be noted that the N+ diffusio area 76 is illustrated so as to provide a desired ohmic contact between the portion 77 of the N-type layer 73 that forms the base of the transistor 70 and the terminal 20 at which the alternator-supplied signal D+ is provided. Because of the vertical PNP configuration for the transistor 70, it is noted that the reverse breakdown potentials for the P-N junctions of this transistor are substantial, since relatively large areas are provided for the junctions. This is achieved without extensive utilization of additional horizontal area of the integrated circuit 60. If the transistor 70 had been implemented as an NPN transistor, or a PNP transistor without one P region corresponding to the P substrate, a substantially more complex integrated circuit topology would have been required which would have consumed valuable horizontal real estate on the integrated circuit to insure sufficient reverse breakdown ratings for the junctions of the trnnsistor 70.

FIG. 4 also illustrates preferred constructions for the Darlington PNP transistors 64 and 65 wherein again transistor 64 comprises structure substantially identical to the structure for transistor 70 and therefore also comprises a vertical PNP substrate transistor. Transistor 65 also has a similar construction, but is illustrated as having a multiple emitter and base connection. This may be required because of the greater current carrying capacity of transistor 65 since it forms the output device of the output stage 63. It is apparent from viewing FIG. 4 that the use of PNP vertical substrate transistors also eliminates the requirement for an additional metallization to connect in common all of the collectors of the transistors 64, 65 and 70. It should be noted that with the circuit configurations in FIGS. 3 and 4, even if the transistors 64 and 65 partially conduct during initial field coil excitation current, this conduction will merely add to the total amount of field coil excitation current that is available and therefore enhance operation of the present voltage regulator 60 during the critical engine start-up period.

Figure 5:
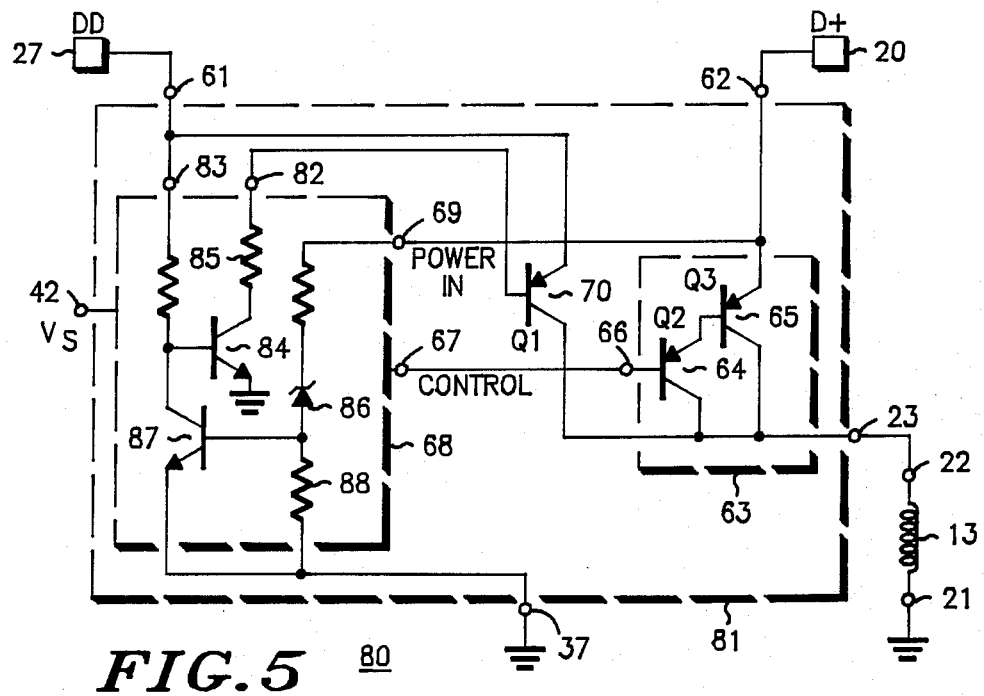
FIG. 5 is an electrical schematic of an alternate embodiment of the voltage regulator portion shown in FIG. 3.

Referring to FIG. 5, another embodiment for the present invention is illustrated as comprising a voltage regulator portion 80 suitable for direct substitution for the voltage regulator portion 50 shown in FIG. 1. The voltage regulator portion 80 includes an integrated circuit 81 which is substantially similar to the integrated circuit 60 shown in FIG. 3. Because of this substantial similarity, many identical reference numerals are contained in FIGS. 3 and 5.

Essentially, the integrated circuit 81 differs from the integrated circuit 60 in that the output stage 63 now no longer has the resistor 64A connected between the base of the transistor 65 and the control input terminal 66 of the output stage. In addition, the base of the transistor 70, which transistor provides the initial field coil excitation current is now connected somewhat differently. Also, some details of the control circuit 68 are illustrated along with additional connections of this control circuit to various other components.

Referring in more detail to FIG. 5, the base of the transistor 70 is connected to a terminal 82 which represents an output terminal of the control circuit 68. The emitter of the transistor 70 is connected to an input terminal 83 of the control circuit 68. The terminal 83 is connected through a resistor to the base of an NPN transistor 84 having its emitter connector to ground and its collector connected to the terminal 82 through a resistor 85. This configuration results in the transistor 84 being turned on in response to the initial presence of a battery-supplied voltage potential at the terminal 61 prior to the occurrence of an alternator-supplied voltage potential at the terminal 62.

The power input terminal 69 of the control circuit 68 is connected to the terminal 62 and also connected through a resistor in series with a zener diode 86 to the base of an NPN transistor 87. The emitter of this transistor is connected to ground potential, and the base is connected through a resistor 88 to ground potential. The collector of this transistor 87 is connected to the base of the transistor 84. When the alternator-supplied voltage D+ at the terminal 20 exceeds some predetermined fixed voltage limit, with respect to ground potential, I0 causing the zener diode 86 to break down, this turns on the transistor 87 and forces the transistor 84 to turn off. This results in open circuiting the base of the transistor 70 and, therefore, turning this transistor off.

In essence, prior to the alternator producing a sufficient voltage signal at the terminal 20, the transistor 70 will be turned on when a positive voltage is provided at the terminal 61. This results in the transistor 70 providing initial field coil excitation current directly to the field coil 13. In response to sensing at least a predetermined minimum alternator output voltage at the terminal 20, the zener diode 86 breaks down, turns on the transistor 87 and this turns off the transistor 84 and turns off transistor 70. This prevents additional initial field coil excitation from passing through the transistor 70. However, now that the alternator has begun to supply voltage, field coil excitation is provided via the output stage 63 in accordance with the control voltage provided at the control terminal 67. The difference between the configuration in FIG. 5 and the configuration in FIG. 3 relates to the circuitry used to turn the transistor 70 on and off. The circuit configuration for providing the proper switching voltages for the base of the transistor 70 is illustrated in somewhat more detail in FIG. 5 than in FIG. 3. However, for both of the embodiments shown in FIGS. 3 and 5, the switching on and off of the transistor 70 to effectively implement the function of a diesel diode, but have less than a forward-biased voltage drop while providing battery-supplied initial field coil excitation current, is implemented.

Figure 6:
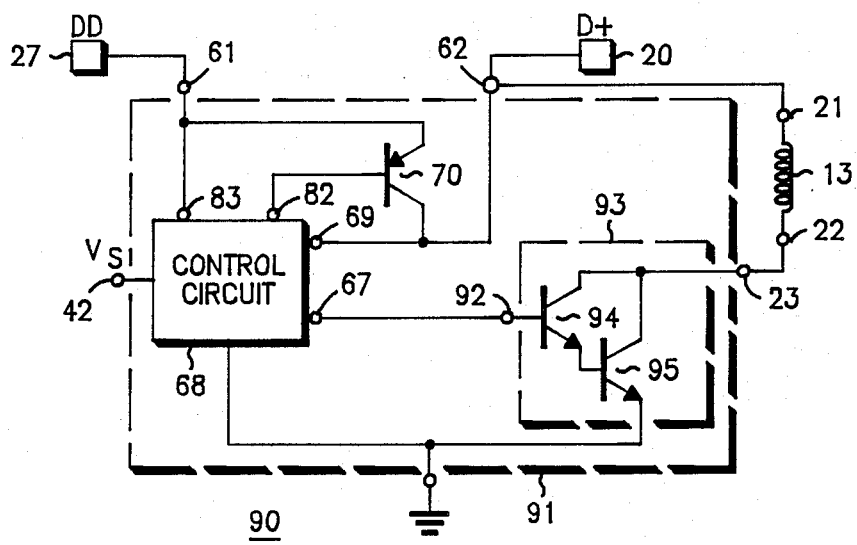
FIG. 6 is a schematic diagram of still another alternate embodiment for the voltage regulator portion shown in FIG. 3.

Referring now to FIG. 6, an embodiment for a voltage regulator portion 90 is illustrated which is suitable for replacing the voltage regulator portion 50 in FIG. 1. The regulator portion 90 includes an integrated circuit 91 having a control circuit 68 configured substantially identical to the control circuit 68 shown in FIG. 5. However, the control circuit 68 in FIG. 6, to provide subsequent field coil excitation current to the field coil 13, provides a high voltage potential at the terminal 67 rather than the low voltage potential. The reason for this difference is that in FIG. 6, the control terminal 67 is connected to an input terminal 92 of an output stage 93 that comprises a Darlington-connected pair of NPN transistors 94 and 95. The collectors of the transistors 94 and 95 are connected at terminal 23 and the emitter of transistor 95 is connected to ground potential. In addition, the field coil terminal 21 in FIG. 6 is now connected to the terminal 62, and this terminal is directly connected to the collector of the transistor 70. All other connections with respect to the integrated circuit 91 and the integrated circuit 81 are identical. It should be noted that in FIG. 6, the detailed configuration of the control circuit is not illustrated, but the control circuit 68 in FIG. 6 includes the components 84 through 88 which function identically as they do in the integrated circuit 81 in FIG. 5.

Essentially, FIG. 6 comprises a dual version of the voltage regulator portion 80 shown in FIG. 5 with the field coil 13 now connected in series with the output stage 93 between ground potential and the potential at the terminal 62. Initially, the potential at the terminal 62 is provided by turning on the transistor 70 and saturating it such that the battery-supplied potential DD at the terminal 27 will supply initial field coil excitation current through the transistor 70, through the field coil 13, and then through the output stage 93. Subsequently, as the alternator-supplied voltage at the terminal 20 increases, the control circuit 68 in FIG. 6 will turn off the transistor 70. Subsequent field coil excitation current will be provided by the alternator-supplied signal D+ at the then terminal 20 and in accordance with the control circuit 68 controlling the conductivity of the output stage 93. FIG. 6 has been illustraed to show the possible alternate configuration of a voltage regulator if an NPN Darlington output stage, instead of the PNP Darlington output stage of FIG. 5, is utilized, and if the field coil 13 is connected between the second input external lead terminal 62 and the output external lead terminal 23. In FIG. 6, still the transistor 70 is switched on provide a minimum voltage drop while providing initial field coil excitation current, and this transistor is switched off to prevent the voltage D+ at the terminal 20 from providing a voltage at the terminal 27 after the ignition switch 31 is opened.

While we have shown and described specific embodiments of the present invention, further modifications and improvements will occur to those skilled in the art. All such modifications which retain the basic underlying principles disclosed and claimed herein are within the scope of this invention.

We claim:

1. A voltage regulator comprising:

first means for receiving a battery-supplied voltage at a first input terminal and coupling said battery-supplied voltage to another terminal to be connected to a field coil of an alternator to provide a voltage source for initial field coil excitation current;

second means for receiving at a second input terminal an alternator-supplied voltage varying in accordance with power output of said alternator, said second means including an output stage means providing an output signal at an output terminal, selectively and in accordance with a sensed variable input voltage, to control subsequent field coil excitation current provided from said alternator-supplied voltage subsequent to said initial field coil excitation current, said output terminal to be connected to said field coil with said output stage means in series with said field coil and said alternator-supplied voltage provided across the series connection of said field coil and said output stage means such that said alternator-supplied voltage provides a voltage ource for said subsequent field coil excitation current;

said first means including a semiconductor device which passes said initial field coil excitation current from said first input terminal to said field coil and prevents current flow from the alternator-supplied voltage at said second input terminal to said first input terminal, said second means being formed as part of a semiconductor integrated circuit (IC) with said second input terminal and said output terminal each corresponding to separate associated input and output external leads of said IC, respectively, wherein the improvement comprises said semiconductor device comprising a transistor means for passing said initial field coil excitation current from said first input terminal through emitter and collector electrodes of said transistor means to one of said output and input external leads, a base electrode of said transistor means connected to circuitry means for turning said transistor on during the providing of said initial field coil excitation current and for turning said transistor off, and thereby preventing current flow between said emitter and collector electrodes, during the providing of said subsequent field coil excitation current.

2. A voltage regulator according to claim 1 wherein said circuitry means turns said transistor means on during providing said initial field coil current excitation such that the voltage between said emitter and collector electrodes is less than the voltage drop across one forward-biased semiconductor diode.

3. A voltage regulator according to claim 2 wherein said transistor means is a PNP transistor having an emitter electrode connected to said first input terminal and wherein said PNP transistor has its collector electrode connected to one of said output and input external leads.

4. A voltage regulator according to claim 3 wherein said circuitry means turns said transistor means off in response to the voltage at said second input terminal exceeding a predetermined voltage level.

5. An integrated circuit voltage regulator comprising:

first means for receiving a battery-supplied voltage at a first input terminal and coupling said battery-supplied voltage to another terminal to be connected to a field coil of an alternator to provide a voltage source for initial field coil excitation current;

second means for receiving at a second input terminal an alternator-supplied voltage varying in accordance with power output of said alternator, said second means including an output stage means providing an output signal at an output terminal, selectively and in accordance with a sensed variable input voltage, to control subsequent field coil excitation current provided from said alternator-supplied voltage subsequent to said initial field coil excitation current, said output terminal to be connected to said field coil with said output stage means in series with said field coil and said alternator-supplied voltage provided across the series connection of said field coil and said output stage means such that said alternator-supplied voltage provides a voltage source for said subsequent field coil excitation current;

said first means including a semiconductor device which passes said initial field coil excitation current from said first input terminal to said field coil and prevents current flow from the alternator-supplied voltage at said second input terminal to said first input terminal, said second means being formed as part of a semiconductor integrated circuit (IC) with said second input terminal and said output terminal each corresponding to separate associated second input and output external leads of said IC, respectively, wherein the improvement comprises said first means being formed as part of said IC with said first input terminal corresponding to a first input external lead of said IC separate from said second input external lead, and wherein said semiconductor device comprises a transistor means, formed as part of said IC, for passing said initial field coil excitation current from said first input terminal through emitter and collector electrodes of said transistor means to one of said output and second input external leads, a base electrode of said transistor means connected to circuitry means in said IC for turning said transistor on during the providing of said initial field coil excitation current and for turning said transistor off, and thereby preventing current flow between said emitter and collector electrodes, during the providing of said subsequent field coil excitation current.

6. An integrated circuit voltage regulator according to claim 5 wherein said circuitry means turns said transistor means on during providing said initial field coil excitation current such that the voltage between said emitter and collector electrodes of said transistor means is less than the voltage drop across one forward-biased semiconductor diode.

7. An integrated circuit voltage regulator according to claim 6 wherein said transistor means is a PNP transistor having an emitter electrode connected to said first input external lead.

8. An integrated circuit voltage regulator according to claim 7 wherein said PNP transistor has its collector electrode connected to one of said output (23) and second input (62) external leads.

9. An integrated circuit voltage regulator according to claim 8 wherein said IC has a substrate portion on which all semiconductor components in said IC are formed and wherein said collector electrode of said PNP transistor corresponds to said substrate portion with said PNP transistor therefore comprising a vertical PNP substrate transistor.

10. An integrated circuit voltage regulator according to claim 9 wherein said output stage means includes at least one PNP output transistor having its collector electrode corresponding to said substrate portion with said output stage means PNP transistor therefore also comprising a vertical PNP substrate transistor.

11. An integrated circuit voltage regulator according to claim 10 wherein said another terminal of said first means corresponds to said output external lead.

12. An integrated circuit voltage regulator according to claim 6 wherein said another terminal of said first means corresponds to said second input external lead.

13. An integrated circuit voltage regulator according to claim 6 wherein said circuitry means turns said transistor means off in response to the voltage at said second input terminal exceeding a predetermined voltage level.

14. An integrated circuit voltage regulator according to claim 13 wherein said predetermined voltage level is measured with respect to a fixed voltage potential.

15. An integrated circuit voltage regulator according to claim 13 wherein said predetermined voltage level is measured with respect to the voltage difference between said first and second input terminals.

16. An integrated circuit voltage regulator according to claim 8 wherein said circuitry means turns said transistor means off in response to the voltage at said second input terminal exceeding a predetermined voltage level, wherein said predetermined voltage level is measured with respect to the voltage difference between said first and second input terminals, and wherein said circuitry means comprises a connection between the base electrode of said transistor means and said second input external lead.

17. A charging system comprising:
a battery;
an alternator, including a field coil, for developing a charging current across charging terminals for charging said battery; and
a voltage regulator for controlling field coil current excitation, said voltage regulator comprising:
first means for receiving a battery-supplied voltage at a first input terminal and coupling said battery-supplied voltage to another terminal connected to said field coil of said alternator to provide a voltage source for initial field coil excitation current;
second means for receiving at a second input terminal an alternator-supplied voltage varying in accordance with power output of said alternator, said second means including an output stage means providing an output signal at an output terminal, selectively and in accordance with a sensed variable input voltage, to control subsequent field coil excitation current provided from said alternator-supplied voltage subsequent to said initial field coil excitation current, said output terminal connected to said field coil with said output stage means in series with said field coil and said alternator-supplied voltage provided across the series connection of said field coil and said output stage means such that said alternator-supplied voltage provides a voltage source for said subsequent field coil excitation current;
said first means including a semiconductor device which passes said initial field coil excitation current from said first input terminal to said field coil and prevents current flow from the alternator-supplied voltage at said second input terminal to said first input terminal,
said second means being formed as part of a semiconductor integrated circuit (IC) with said second input terminal and said output terminal each corresponding to separate associated second input and output external leads of said IC, respectively,
wherein the improvement comprises said first means being formed as part of said IC with said first input terminal corresponding to a first input external lead of said IC separate from said second input external lead, and wherein said semiconductor device comprises a transistor means, formed as part of said IC, for passing said initial field coil excitation current from said first input terminal through emitter and collector electrodes of said transistor means to one of said output and second input external leads, a base electrode of said transistor means connected to circuitry means in said IC for turning said transistor on during said initial field coil excitation current and for turning said transistor off, and thereby preventing current flow between said emitter and collector electrodes, during the providing of said subsequent field coil excitation current.

18. A charging system according to claim 17 which includes auxiliary diode means for providing said alternator-supplied voltage at said second input terminal, said auxiliary means comprising rectifying diodes connected to windings of said alternator, said second input terminal separate from said alternator charging terminals.

19. A charging system according to claim 18 which includes a switch means for selectively coupling one terminal of said battery to said first input terminal, said system including load means coupled to said first input terminal for receiving operative power from said battery in accordance with said switch means and independent of the alternator voltage provided at said second input terminal.

20. A charging system according to claim 19 wherein said circuitry means turns said transistor means on during providing said initial field coil excitation current such that the voltage between said emitter and collector electrodes of said transistor means is less than the voltage drop across one forward-biased semiconductor diode.

21. A charging system according to claim 20 wherein said transistor means is a PNP transistor having an emitter electrode connected to said first input external lead, and wherein said PNP transistor has its collector electrode connected to said one of said output and second input leads.

22. A charging system according to claim 21 wherein said IC has a substrate portion on which all semiconductor components in said IC are formed and wherein said collector of said PNP transistor corresponds to said substrate portion with said PNP transistor therefore comprising a vertical PNP substrate transistor.

23. A charging system according to claim 22 wherein said circuitry means turns said transistor means off in response to the voltage at said second input terminal exceeding a predetermined voltage level.

* * * * *